United States Patent
Kawaji (10) Patent No.: US 9,472,985 B2
(45) Date of Patent: Oct. 18, 2016

(54) ROTOR YOKE WITH CIRCUMFERENTIAL RECESS PORTIONS AND MOTOR APPLYING ROTOR YOKE

(71) Applicant: AISIN SEIKI KABUSHIKI KAISHA, Kariya-shi (JP)

(72) Inventor: Manabu Kawaji, Kariya (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 471 days.

(21) Appl. No.: 13/946,245

(22) Filed: Jul. 19, 2013

(65) Prior Publication Data

US 2014/0042861 A1    Feb. 13, 2014

(30) Foreign Application Priority Data

Aug. 10, 2012 (JP) .................................. 2012-178300

(51) Int. Cl.
*H02K 1/27* (2006.01)
*H02K 1/28* (2006.01)

(52) U.S. Cl.
CPC ................. *H02K 1/276* (2013.01); *H02K 1/28* (2013.01)

(58) Field of Classification Search
CPC ...... H02K 1/27; H02K 1/2706; H02K 1/272; H02K 1/274; H02K 1/2753; H02K 1/276
USPC ............ 310/156.53, 156.38, 156.45, 156.46, 310/156.57
See application file for complete search history.

(56) References Cited

U.S. PATENT DOCUMENTS

| | | | | |
|---|---|---|---|---|
| 5,864,191 A | * | 1/1999 | Nagate | H02K 1/276 310/156.53 |
| 2009/0152972 A1 | * | 6/2009 | Nishijima | H02K 1/276 310/156.57 |
| 2012/0007455 A1 | | 1/2012 | Tanaka | |
| 2012/0104891 A1 | * | 5/2012 | Yamaguchi | H02K 1/276 310/156.53 |

FOREIGN PATENT DOCUMENTS

| | | |
|---|---|---|
| JP | 2004-96978 A | 3/2004 |
| JP | 2010-236453 A | 10/2010 |
| JP | 2011-4480 A | 1/2011 |
| JP | 2011-55619 A | 3/2011 |
| JP | 2012-44769 A | 3/2012 |

OTHER PUBLICATIONS

Office Action issued on May 24, 2016, by the Japanese Patent Office in corresponding Japanese Patent Application No. 2012-178300, and an English translation of the Office Action. (5 pages).

* cited by examiner

*Primary Examiner* — Michael Andrews
(74) *Attorney, Agent, or Firm* — Buchanan Ingersoll & Rooney PC (57) ABSTRACT

A rotor yoke includes plural rotor cores having a disk shape laminated to be formed in a cylindrical shape, plural magnet inserting holes each including a longitudinal side and a transverse side, penetrated in a laminating direction of the rotor yoke, a bridge portion arranged between the magnet inserting holes adjacent to one another in a circumferential direction of the rotor cores and connecting an inner area to an outer area, a recessed portion arranged at the bridge portion and formed from the outer circumferential surface of the rotor cores toward radially inward and a protruding edge protruding toward an inside of the magnet inserting hole.

18 Claims, 10 Drawing Sheets

ROTOR YOKE WITH CIRCUMFERENTIAL RECESS PORTIONS AND MOTOR APPLYING ROTOR YOKE

CROSS REFERENCE TO RELATED APPLICATIONS

This application is based on and claims priority under 35 U.S.C. §119 to Japanese Patent Application 2012-178300, filed on Aug. 10, 2012, the entire content of which is incorporated herein by reference.

TECHNICAL FIELD

This disclosure generally relates to a rotor yoke and a motor applying the rotor yoke.

BACKGROUND DISCUSSION

According to a known rotor yoke of an inner rotor motor, a rotor is configured by mounting a rotation shaft and a field pole magnet (hereinafter referred to as a magnet) to the rotor yoke. Because the inner rotor motor has a structure that the rotor is arranged at an inner side of the motor and a stator wound with a coil is arranged at an outer side of the rotor, the inner rotor motor has characteristics that, for example, a moment of inertia of the rotor is small and heat dissipation of the coil is preferable. Normally, the magnet is not magnetized before being mounted to the rotor yoke, and is magnetized by a magnetizing yoke after the magnet is mounted on the rotor yoke. When magnetizing the magnet, in order to apply desired magnetic properties to the magnet, a positioning of the rotor yoke with the magnet mounted against the magnetizing yoke needs to be precise.

A known electric motor rotor is disclosed in JP2010-236453A (hereinafter referred to as Patent reference 1). According to the Patent reference 1, an electric motor rotor including a substantially columnar rotor laminated steel plate internally having a permanent magnet is disclosed. The rotor laminated steel plate of the electric motor rotor is formed with plural refrigerant gas holes axially penetrating, and plural rivet holes circumferentially arranged and axially penetrating. At least one of the plural rivet holes is used as a positioning hole for inserting a positioning pin to position a rotor in a rotational direction when the rotor is magnetized.

According to the rotor laminated steel plate of the Patent reference 1, plural magnets are arranged circumferentially. Each magnet extends in an axial direction over an entire length thereof. The rivet holes are arranged between the magnets which are adjacent to each other and slightly radially inner of the magnets. However, the rivet holes are arranged at a portion of a magnetic circuit (hereinafter also referred to as a magnetic path) generated when the motor is operated as the electric motor. This arrangement decreases magnetic efficiency of the motor because the rivet holes act as magnetic resistance.

Because the rotor laminated steel plate exists between the magnets adjacent to one another in a circumferential direction, magnetic field lines are leaked between the magnets adjacent to one another in the circumferential direction from a magnetic path formed between the rotor laminated steel plate and the stator. Thus, magnetic efficiency of the motor is decreased.

A need thus exists for a rotor yoke and a motor applying the rotor yoke which is not susceptible to the drawback mentioned.

SUMMARY

According to an aspect of this disclosure, a rotor yoke includes plural rotor cores having a disk shape laminated to be formed in a cylindrical shape, plural magnet inserting holes each including a longitudinal side and a transverse side arranged on a surface of the rotor cores orthogonal to a rotation shaft, the longitudinal side of the magnet inserting holes arranged separately from one another near an outer circumferential surface of the rotor cores along a circumferential direction, the magnet inserting holes penetrated in a laminating direction of the rotor yoke, a bridge portion arranged between the magnet inserting holes adjacent to one another in a circumferential direction of the rotor cores and connecting an inner area arranged radially inward of the magnet inserting holes to an outer area arranged radially outward of the magnet inserting hole, a recessed portion arranged at the bridge portion and formed from the outer circumferential surface of the rotor cores toward radially inward, and a protruding edge arranged at the bridge portion and protruding toward an inside of the magnet inserting hole to include a most protruding edge at a portion of the transverse side.

According to another aspect of this disclosure, a motor includes a rotor yoke including plural rotor cores having a disk shape laminated to be formed in a cylindrical shape, plural magnet inserting holes each including a longitudinal side and a transverse side arranged on a surface of the rotor cores orthogonal to a rotation shaft, the longitudinal side of the magnet inserting holes arranged separately from one another near an outer circumferential surface of the rotor cores along a circumferential direction, the magnet inserting holes penetrated in a laminating direction of the rotor yoke, a bridge portion arranged between the magnet inserting holes adjacent to one another in a circumferential direction of the rotor cores and connecting an inner area arranged radially inward of the magnet inserting holes to an outer area arranged radially outward of the magnet inserting hole, a recessed portion arranged at the bridge portion and formed from the outer circumferential surface of the rotor cores toward radially inward, and a protruding edge arranged at the bridge portion and protruding toward an inside of the magnet inserting hole to include a most protruding edge at a portion of the transverse side.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
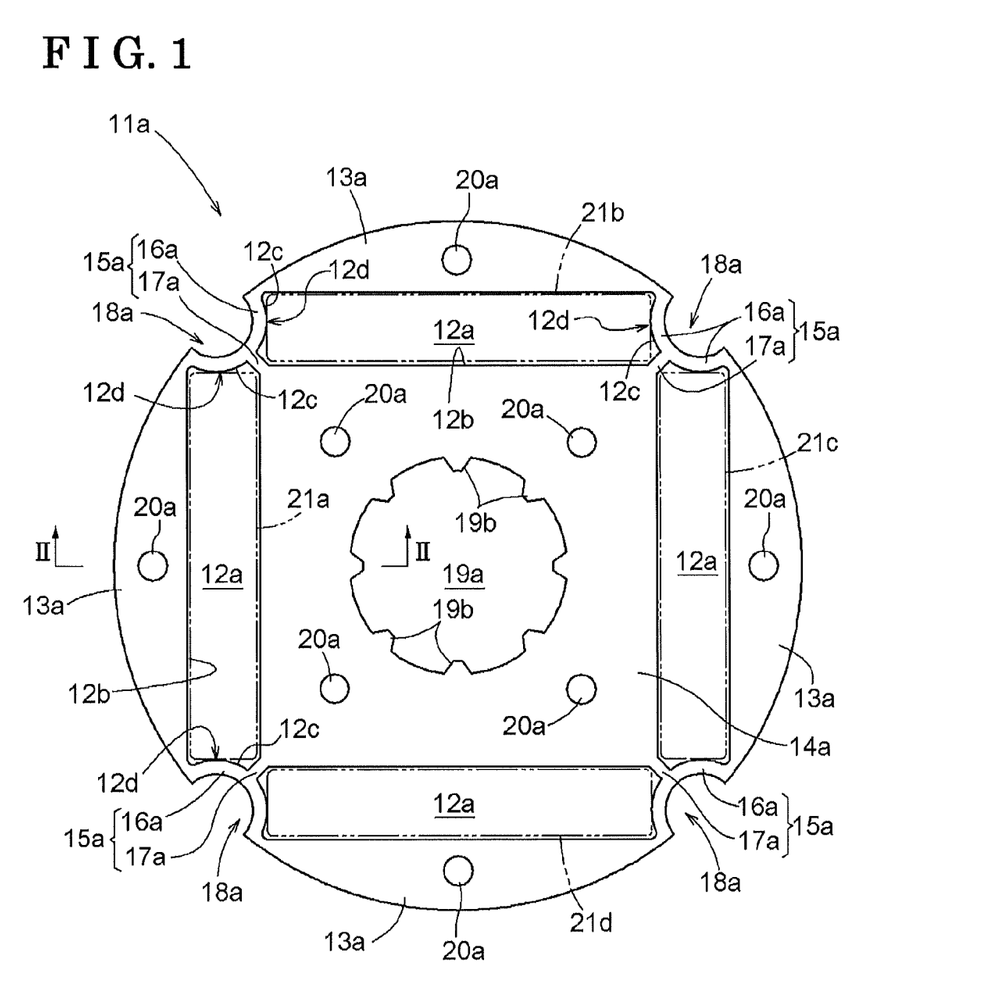
FIG. 1 is a plan view of a first rotor core forming a first rotor yoke disclosed here.
Figure 2:
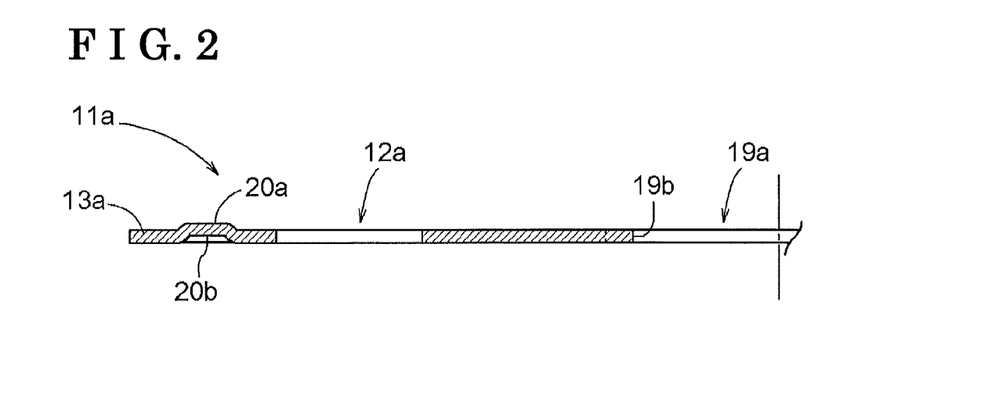
FIG. 2 is a cross-sectional view taken along line II-II in FIG. 1.

A structure of a first embodiment of this disclosure will be described in detail with reference to attached drawings as follows. As illustrated in FIG. 1, the first rotor core 11a is formed by processing a thin electromagnetic steel plate with, for example, a press machine. The first rotor core 11a has a circular shape and includes a rotation shaft inserting hole 19a. The rotation shaft inserting hole 19a having a circular shape is coaxially arranged and opened at a center of the first rotor core 11a. According to the first embodiment, for example, eight projection portions 19b are formed at an inner circumferential surface of the rotation shaft inserting hole 19a and project radially inward. The projection portion 19b corresponds to a press fit allowance when a rotation shaft 22 is inserted and fixed. The number of the projection portions 19b is eight in the first embodiment, which is not limited to this.

For example, four magnet inserting holes 12a having a substantially rectangular shape are opened near an outer circumferential edge (corresponding to an outer circumferential surface when laminated) radially outward of the rotation shaft inserting hole 19a of the first rotor core 11a. The magnet inserting hole 12a is positioned in a state where a longitudinal side (hereinafter, referred to as a long side 12b) is arranged near an outer circumferential surface of the first rotor core along a circumferential direction. The long side 12b of the magnet inserting hole 12a corresponds to a linear portion arranged near an outer circumferential surface of the first rotor core along a circumferential direction while a transverse side (hereinafter, referred to as a short side 12c) of the magnet inserting hole 12a corresponds to portions other than the long side 12b. The magnet inserting holes 12a, 12a adjacent to one another are arranged in a state where the short sides 12c, 12c are close to the magnet inserting holes 12a, 12a and include clearances between the short sides 12c, 12c and the magnet inserting holes 12a, 12a. A portion arranged between the short sides 12c, 12c to divide the short sides 12c, 12c is called a bridge portion 15a. A portion between the long side 12b positioned radially outward of the magnet inserting hole 12a and an outer circumferential edge of the first rotor core 11a facing one another is called an outer area 13a. A portion between the long side 12b radially inward of the magnet inserting hole 12a and the rotation shaft inserting hole 19a facing one another is called an inner area 14a. The outer area 13a and the inner area 14a communicate with one another via the bridge portion 15a.

A recessed portion 18a is formed at an outer circumferential edge of the first rotor core 11a radially outward of each bridge portion 15a. The recessed portion 18a has a cutout arc shape and directs, or recessed radially inward from the outer circumferential edge of the first rotor core 11a. The recessed portion 18a is formed to be close to the magnet inserting holes 12a, 12a and accordingly, the short side 12c is curved to protrude toward an inside of the magnet inserting hole 12a. A protruding edge 12d (also serving as a most protruding edge), the most protruding portion of the short side 12c toward the inside of the magnet inserting hole 12a is at a portion of the short side 12c, instead of edges of the short side 12c. According to FIG. 1, a two-dot chain line illustrated at the inside of the magnet inserting hole 12a describes a magnet 21. The magnet 21 and the short side 12c are closest one another around the protruding edge 12d.

The bridge portion 15a includes a first bridge portion 16a and a second bridge portion 17a. The first bridge portion 16a is a portion arranged between the recessed portion 18a and the short side 12c while the second bridge portion 17a is a portion arranged between the short sides 12c, 12c adjacent to one another. Widths of the first bridge portion 16a and the second bridge portion 17a are approximately equal to a plate thickness of the first rotor core 11a. The first bridge portion 16a connects to the second bridge portion 17a near a portion the most radially inward of the first rotor core 11a.

Figure 3:
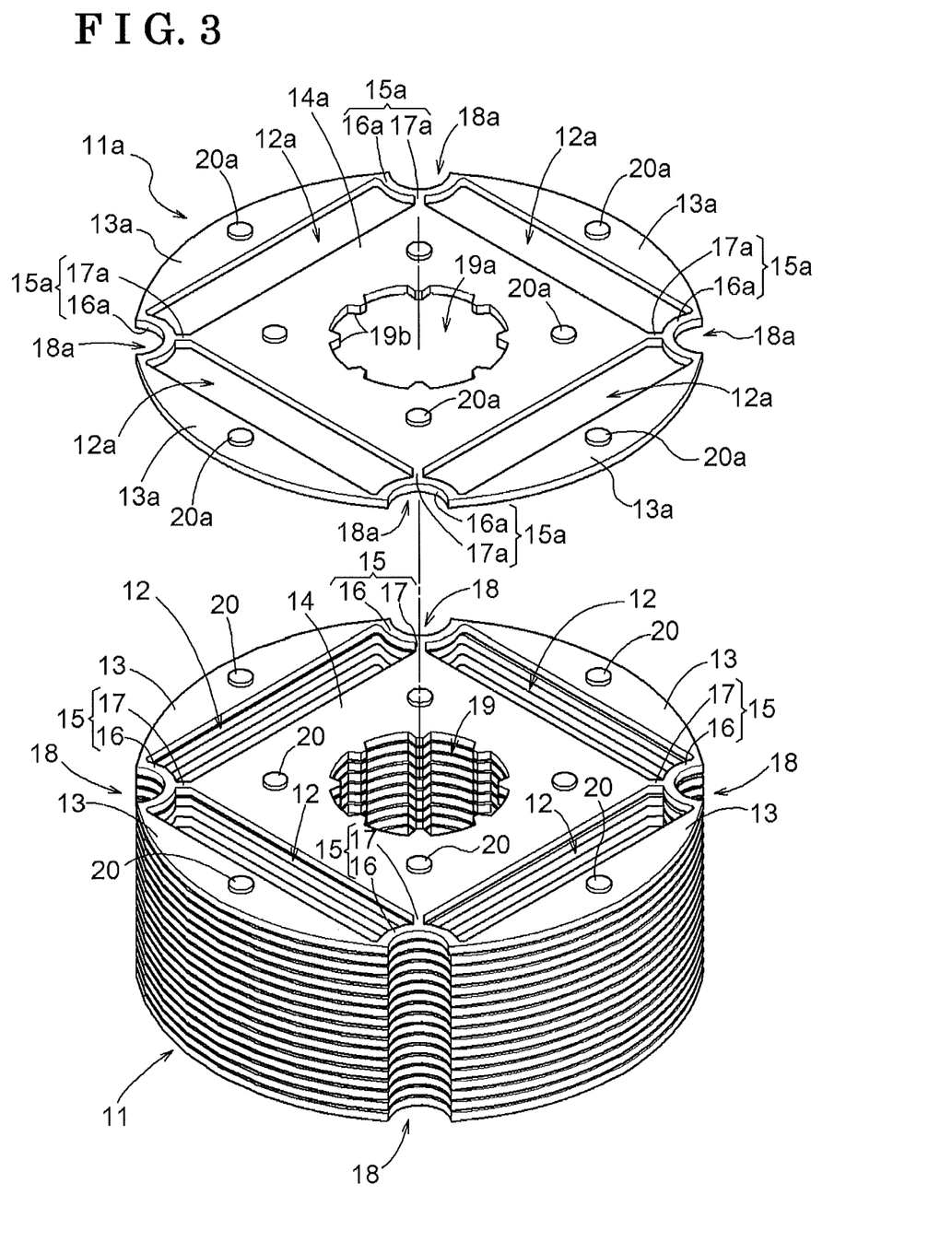
FIG. 3 is a perspective view of an exterior of the first rotor yoke.

As illustrated in FIG. 1, for example, eight protrusions 20a are formed at the first rotor core 11a. Because the protrusion 20a is formed with a stamping process, the protrusion 20a forms a recession 20b at an opposite surface of the protrusion 20a. The first rotor yoke 11 is formed by laminating the first rotor cores 11a. According to FIG. 3, when the first rotor core 11a is laminated, the protrusion 20a is fitted into the recession 20b to connect each of the first rotor cores 11a. The first rotor yoke 11 is formed by being laminated in an overlapped manner with the magnet inserting hole 12a, the outer area 13a, the inner area 14a, the bridge portion 15a, the first bridge portion 16a, the second bridge portion 17a, the recessed portion 18a, the rotation shaft inserting hole 19a, the protrusion 20a and others which are all formed at each of the first rotor core 11a. After the rotor core 11a is laminated, the magnet inserting hole 12a, the outer area 13a, the inner area 14a, the bridge portion 15a, the first bridge portion 16a, the second bridge portion 17a, the recessed portion 18a, the rotation shaft inserting hole 19a and the protrusion 20a serve as a magnet inserting hole 12, an outer area 13, an inner area 14, a bridge portion 15, a first bridge portion 16, a second bridge portion 17, a recessed portion 18, a rotation shaft inserting hole 19 and a protrusion 20, respectively.

Figure 4:
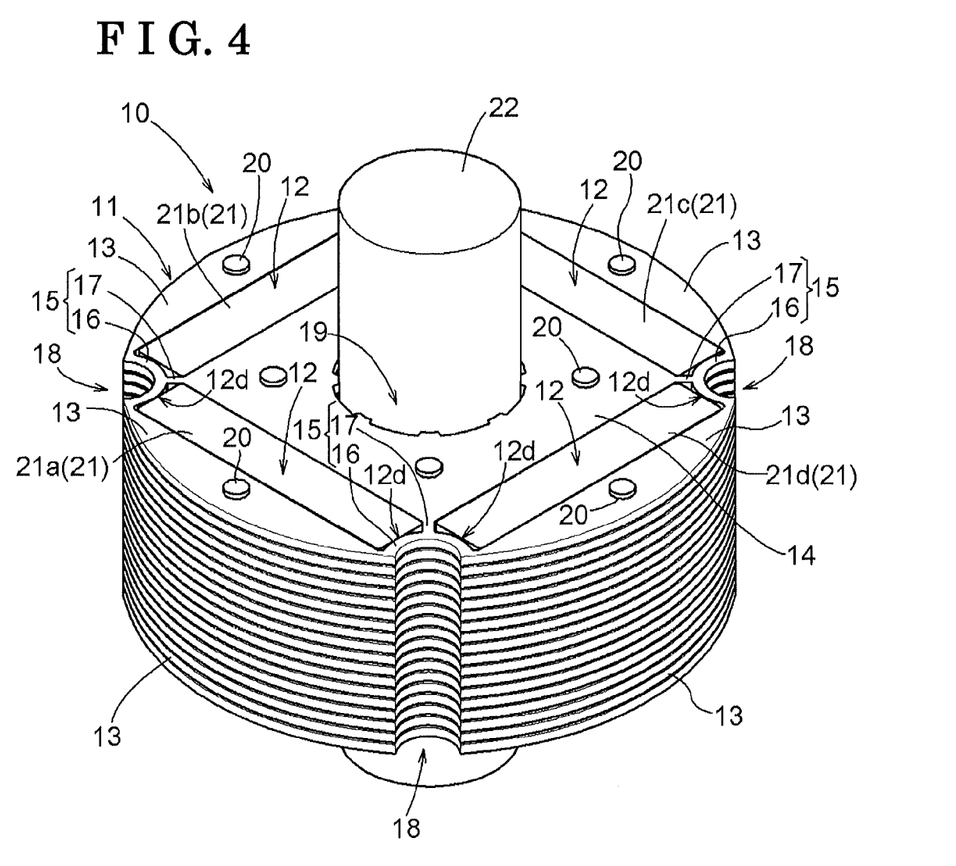
FIG. 4 is a perspective view of an exterior of the first rotor.

A structure of the first rotor 10 will be described as follows. As illustrated in FIG. 4, the first rotor 10 is magnetized after a first magnet 21a, a second magnet 21b, a third magnet 21c and a fourth magnet 21d (a magnet 21 when describing all as one) are inserted into and fixed to the first rotor yoke 11. Then, the rotation shaft 22 is pressed into the first rotor 10. The magnet 21 has a cuboid shape and is not magnetized when inserted into the first rotor yoke 11. A length of the magnet 21 is slightly shorter than a distance between the protruding edges 12d facing one another at the magnet inserting hole 12. Accordingly, after the magnet 21 are inserted, a small clearance in which a stress from the magnet inserting hole 12 is not applied is formed. A thickness of the magnet 21 is slightly thinner than a distance between the long sides 12b parallel to one another. Accordingly, after the magnet 21 is inserted, a small clearance in which a stress from the magnet inserting hole 12 is not applied is formed. Thus, the magnet 21 rarely moves circumferentially and radially. A height of the magnet 21 is slightly shorter than a height of the first rotor yoke 11 in a laminating direction. The magnet 21 is simply cut from a large chunk of a magnet without a chamfering process so that corner portions of the magnet 21 are sharp.

The magnet 21 is fixed by, for example, pouring an adhesive member with the magnet 21 inserted into the magnet inserting hole 12. In a case where the magnet 21 is fixed with the adhesive member, an excessive adhesive member is gathered at a clearance (see FIG. 5) inside the magnet inserting hole 12. The clearance is formed by a difference between the height of the magnet 21 and the height of the first rotor yoke 11 in the laminating direction, and the excessive adhesive member is not leaked to an outer surface of the first rotor yoke 11.

As illustrated in FIGS. 1 and 4, because the protruding edge 12d is arranged at the portion of the short side 12c, the clearances exist between the corner portions of the magnet 21 and the short side 12c. Thus, without executing the chamfering process, the corner portions of the magnet 21 do not contact an inner circumferential surface of the magnet inserting hole 12a. As a result, the stress from the magnet inserting hole 12 is not applied to the corner portions of the magnet 21 after the magnet 21 is inserted. Even if the corner portions of the magnet 21 are sharp, the corner portions of the magnet 21 may not be chipped or broken.

The magnet 21 is magnetized by a magnetization process after the magnet 21 is inserted and fixed. When magnetizing the magnet 21, for example, four recessed portions 18 are used to position the first rotor yoke 11 against a magnetizing yoke. That is, the recessed portion 18 serves as a form for positioning of the first rotor yoke 11 when magnetizing the magnet 21. Because the recessed portion 18 has the arc shape, a cylindrical shaft may be used for positioning the first rotor yoke 11. As the cylindrical shaft for positioning a rotor yoke is lower in cost than a rectangular member inserted in a magnet inserting hole to adjust a height of the magnet and the rotor yoke for positioning a rotor yoke against a magnetized yoke, the positioning of the rotor yoke may be performed with a low cost structure. Also, in a case where, for example, four sheets of the magnet 21 and the rectangular member are used for positioning of the first rotor yoke 11 against the magnetized yoke, a height of the first rotor yoke 11 may become higher by a thickness of the rectangular member because the rectangular member exists to adjust the height. However, according to the embodiment, when the cylindrical shaft is used, the rectangular member is not required for the positioning of the rotor yoke and accordingly, a height of the first rotor yoke 11 may be kept low. The magnet 21 is magnetized to make two magnetized pole faces parallel to the long sides 12b be magnetized poles. After the magnetization of the magnet 21 is completed, an assembling of the first rotor 10 is completed by pressing the rotation shaft 22 into the rotation shaft inserting hole 19 to penetrate the first rotor yoke 11.

Acting as magnetized pole faces, surfaces radially outward of the first magnet 21a and the third magnet 21c are magnetized into N pole while surfaces radially inward of the first magnet 21a and the third magnet 21c are magnetized into S pole. On the other hand, surfaces radially outward of the second magnet 21b and the fourth magnet 21d are magnetized into S pole while surfaces radially inward of the second magnet 21b and the fourth magnet 21d are magnetized into N pole. As magnetic field lines of the magnet 21 enter and leave in a vertical direction of a magnetic pole face, magnetic field lines which leave the magnetic pole face magnetized into N pole (hereafter referred to as a N pole face) of the first magnet 21a pass through the outer area 13 and enter into a stator 50 (illustrated in FIG. 5) which faces the outer area 13. A half of the magnetic field lines leaving the magnetic pole face magnetized into N pole of the first magnet 21a leaves the stator 50, passes through the outer area 13 adjacent to the stator 50 and enters into the magnetic pole face magnetized into S pole (hereafter referred to as a S pole face) of the second magnet 21b which are adjacent to the outer area 13. Magnetic field lines which leave the N pole face of the second magnet 21b enter into the S pole face of the first magnet 21a via the inner area 14. The other half of the magnetic field lines leaving the magnetic pole face magnetized into N pole of the first magnet 21a enters into the stator 50 facing the first magnet 21a, passes through the outer area 13 adjacent to the stator 50 and enters into the S pole face of the fourth magnet 21d which is adjacent to the outer area 13. A half of the magnetic field lines leaves the N pole face of the fourth magnet 21d, passes through the inner area 14 and enter into the S pole face of the first magnet 21a.

As such, a magnetic path formed by the magnetic field lines of the first magnet 21a passes through the inner area 14. However, different from a known rotor laminated steel plate, no holes which cause magnetic resistance among a magnetic path of the magnet 21 exists. Further, the recessed portion 18 used for positioning the first rotor yoke 11 against the magnetizing yoke does not exist along the magnetic path formed by the magnetic field lines of the first magnet 21a. Thus, magnetic efficiency of the first rotor yoke 11 does not decline. For example, when the motor 1 applying the first rotor 10 is in operation, magnetic efficiency of the motor 1 does not decline. A magnetic path formed by magnetic field lines of the fourth magnet 21d passes in a similar manner as described above.

A part of magnetic field lines which comes from the outer area 13 and does not enter into the stator 50 facing the outer area 13 leaks and enters into the first bridge portion 16 where magnetic resistance is low. However, as a width of the first bridge portion 16 is narrowed by the existence of the recessed portion 18, the first bridge portion 16 immediately causes magnetic saturation and accordingly, other magnetic field lines do not enter into the first bridge portion 16. Furthermore, edges of the outer area 13 and the first bridge portion 16 are intersected substantially at a right angle so that magnetic paths between the outer areas 13, 13 adjacent to one another are not connected in the shortest distance and need to take a detour via the first bridge portion 16. Magnetic field lines try to pass the shortest distance between the outer areas 13, 13 adjacent to one another. However, in a case where a magnetic path connecting the outer areas 13, 13 adjacent to one another with each other curves, rounds or winds as a shape of the first bridge portion 16, a magnetic field line does not pass smoothly between the outer areas 13, 13 adjacent to one another. Thus, by including the recessed portion 18 and the first bridge portion 16, a leakage amount of the magnetic field lines is decreased. That is, magnetic efficiency of the first rotor yoke 11 is increased. For example, magnetic efficiency of the motor 1 applying the first rotor yoke 11 is increased when the motor 1 is in operation.

According to the first embodiment, the recessed portion 18a has the cutout arc shape, which is not limited to this. A cutout polygonal shape may be applied. According to the first embodiment, because the recessed portion 18a is formed, the short side 12c is curved to protrude toward the inside of the magnet inserting hole 12a, which is not limited to this. Forming the recessed portion 18a may not be related to the structure that the short side 12c protrudes toward the inside of the magnet inserting hole 12a. That is, even if a cutout portion of the recessed portion 18a is small, or the recessed portion 18a even does not exist, the short side 12c may be curved to protrude toward the inside of the magnet inserting hole 12a. Furthermore, even if the short side 12c is not curved to protrude toward the inside of the magnet inserting hole 12a, a configuration of the first rotor core 11a is realized as long as the protruding edge 12d exists at the portion of the short side 12c. For example, the short side 12c having a linear shape may include a protruding portion protruding toward the inside of the magnet inserting hole 12a. However, in those circumstances, the width of the first bridge portion 16a may be wider and accordingly, the leakage amount of the magnetic field lines may be increased.

Figure 5:
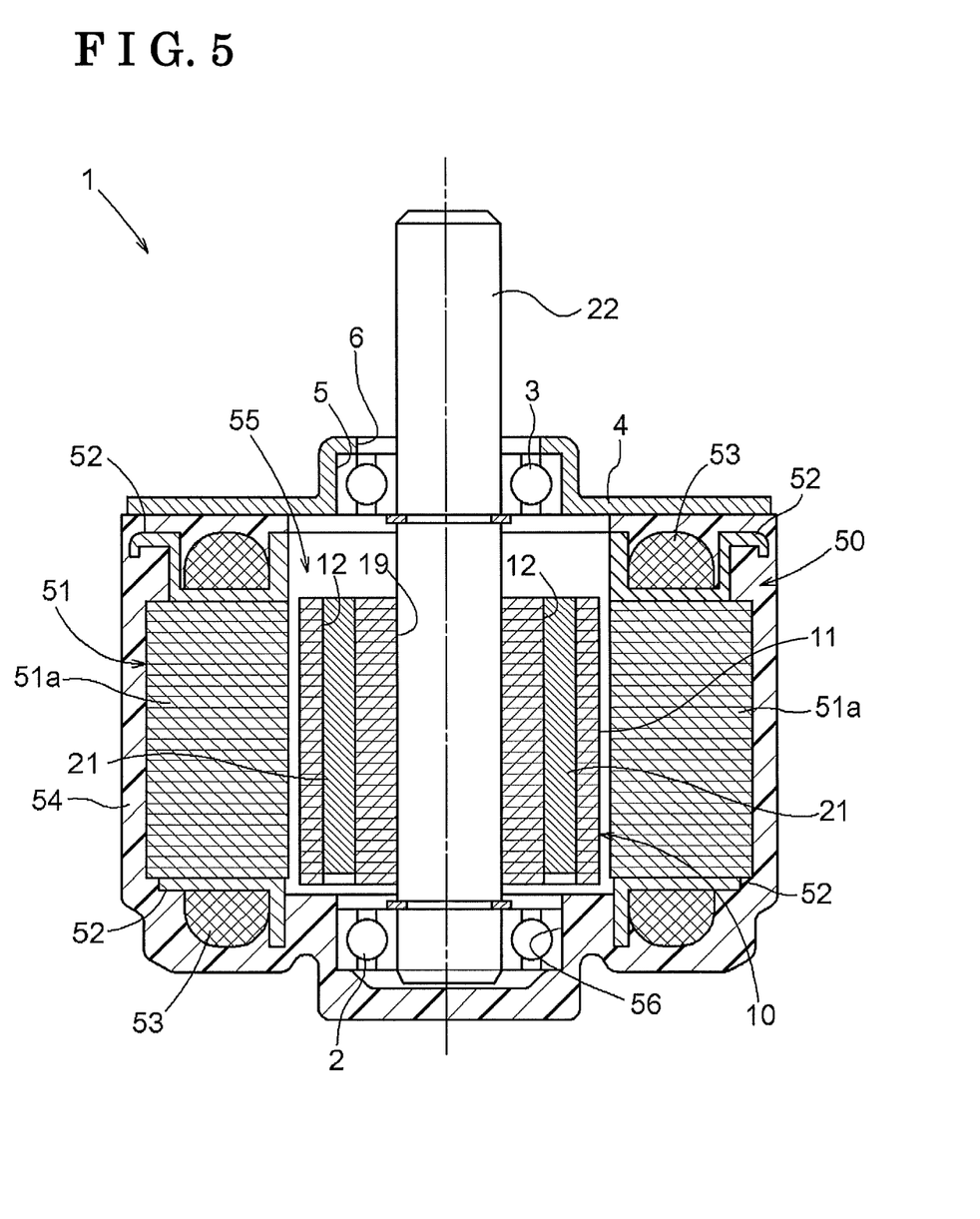
FIG. 5 is a vertical cross-sectional view of a structure of a motor applying the first rotor.

A structure of the motor 1 will be described as follows. As illustrated in FIG. 5, the motor 1 includes the first rotor 10, the stator 50, a bearing 2, a bearing 3 and a cover 4.

The stator 50 includes a stator core 51, a coil supporting frame 52 and a coil 53. The stator core 51 is configured by laminating thin electromagnetic steel plates. The stator core 51 includes an annular outer circumferential portion and, for example, six teeth 51a. The teeth 51a having a T-shape include a portion extending radially inward from the annular outer circumferential portion of the stator core 51 and a portion from an edge of the portion extending radially inward from the annular outer circumferential portion of the stator core 51 extending toward opposing circumferential directions. According to the first embodiment, the number of the teeth 51a is, for example, six because the number of the magnet 21 is, for example, four, which is not limited to this. The number of the teeth 51a is determined by the number of the magnet 21.

The coil supporting frame 52 is a resin thin plate member arranged to cover surroundings of the teeth 51a. When the coil 53 made from a copper wire coated with, for example, enamel is wound around the teeth 51a, the coil supporting frame 52 refrain the teeth 51a and a portion where the coating of the coil wire is torn from being contacted and conducted with one another. The coil 53 is wound around an outer surface of the coil supporting frame 52 in which the teeth 51a is arranged.

The stator 50 is integrally formed and covered by a housing 54 made of resin. A cylindrical void 55 having a bottom surface is formed at a center of the housing 54. The portion of the teeth 51a from the edge of the portion extending radially inward from the annular outer circumferential portion of the stator core 51 extending toward opposing circumferential directions may be exposed to an inner circumferential surface of the cylindrical void 55 or be covered by the thin resin, the member of the housing 54. At the bottom surface of the cylindrical void 55, a bearing hole 56 in which a bearing 2 is inserted to be fitted is formed coaxially as a part of the housing 54.

A cover 4 is a disk-shaped component covering the cylindrical void 55 of the housing 54. The cover 4 is formed by stamping a metal plate including a thin-plate aluminum. At a center of the cover 4, a bearing hole 5 in which a bearing 3 is inserted to be fitted is formed. At a bottom surface of the bearing hole 5, a through hole 6 through which a rotation shaft 22 penetrates is opened coaxially with the bearing hole 5.

The motor 1 is configured with the first rotor 10 that is inserted into the cylindrical void 55 and is fixed by being covered with the cover 4. In the cylindrical void 55 where the first rotor is inserted, the bearing 2 and the bearing 3 are press-fitted onto the rotation shaft 22. The bearing 2 is inserted into the bearing hole 56 to be fixed and press-fitted onto the rotation shaft 22 as a surface of the bearing 2 is substantially flush with a surface of the rotation shaft 22. The bearing 3 is inserted into the bearing hole 5 to be fixed and press-fitted into the rotation shaft 22 as the rotation shaft 22 penetrates the bearing 3. The cover 4 is fixed with the housing 54 by a means of, for example, screwing. At an inside of the cylindrical void 55, an outer circumferential surface of the first rotor 10 spaces a predetermined gap in a radial direction from the stator 50 and faces the stator 50 coaxially.

Next, an operation of the motor 1 will be described. The motor 1 is provided with a motor control circuit at an outer side of the motor 1. The motor control circuit includes a detection means for detecting rotational phase of the first rotor 10 and a current switch control portion selectively flowing current by switching a coil 53 which flows three phase alternating current in accordance with a detection result. Controlled by the motor control circuit, magnetic attraction or repulsion is generated between the teeth 51a and the magnet 21 of the first rotor 10 where magnetic field is generated by flowing current to the coil 53. Accordingly, the first rotor 10 rotates.

Figure 6:
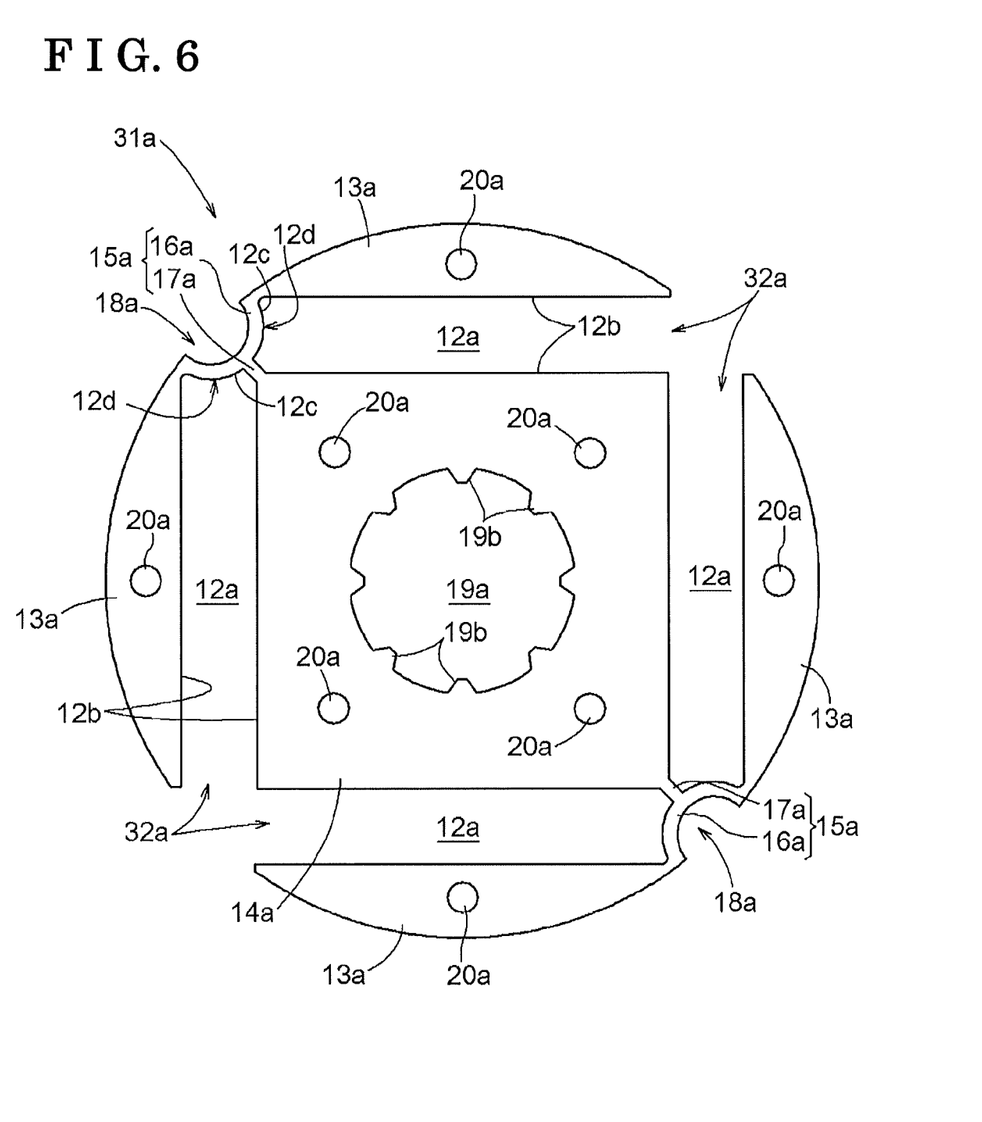
FIG. 6 is a plan view of a second rotor core forming a second rotor yoke.

A second embodiment will be described with reference to FIG. 6 as follows. In descriptions of the second embodiment hereinafter, same reference numerals are applied to portions of a same construction as that of a first embodiment. Descriptions will be omitted because the descriptions relate to the same construction. Compared to the first rotor core 11a in which the bridge portion 15a is formed at each portion between the magnet inserting holes 12a, 12a adjacent to one another, a configuration of the second rotor core 31a is that the bridge portion 15a is removed alternately in a circumferential direction to form a opening portion 32a. By including the opening portion 32a, the electromagnetic steel plate is removed between the magnet inserting holes 12a, 12a adjacent to one another and accordingly, one side of the magnet inserting hole 12a is opened radially outward.

By including the opening portion 32a, the electromagnetic steel plate is removed at a portion where the bridge portion 15a is removed. Thus, compared to a configuration where the bridge portion 15a is included, magnetic resistance at the portion where the bridge portion 15a is removed is increased. When magnetic resistance is increased, the leakage amount of magnetic field lines to the portion where magnetic resistance is increased is decreased and an amount of magnetic field lines entering into the stator 50 is relatively increased. However, in a case where the opening portions 32a are laminated in a same direction adjacent to one another when viewed from the laminating direction to form the second rotor yoke 31, two opening portions are formed at an outer circumferential surface of the second rotor yoke 31 because electromagnetic steel plates do not exist in all of the laminating direction at an outer circumferential surface of the second rotor yoke 31. In such a structure, it is difficult, not only to firmly hold the magnet 21 but also to maintain sufficient numbers of the recessed portions 18 having a form for positioning the second rotor yoke 31 when magnetizing the magnet 21. Further, because the outer area 13 is supported at one side by the first bridge portion 16 and the second bridge portion 17 which have narrow widths, the outer area 13 may be easily deformed by an application of outer force including centrifugal force.

Figure 7:
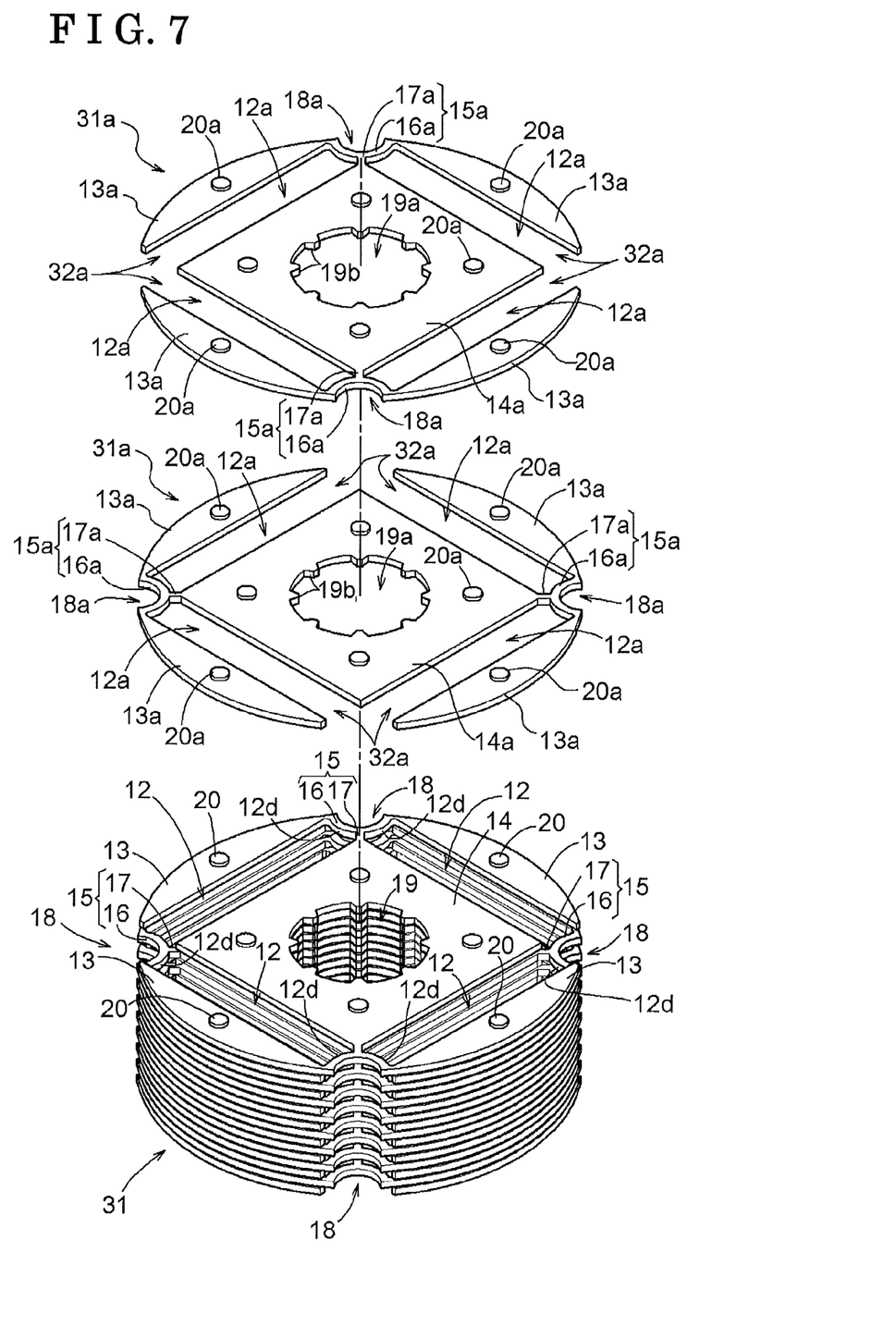
FIG. 7 is a perspective view of an exterior of the second rotor yoke.

As illustrated in FIG. 7, the second rotor core 31a is laminated such that each of the second rotor cores 31a is rotated 90 degrees around a rotation shaft before being laminated. Thus, as the opening portion 32a of the second rotor core 31a is sandwiched by the bridge portions 15a arranged at upper and lower sides of the opening portion 32a in the laminating direction, the opening portions 32a are not arranged sequentially in the laminating direction at the outer circumferential surface of the second rotor yoke 31. As a result, the magnet inserting hole 12 for holding the magnet 21 and the recessed portion 18 having a form for positioning the second rotor yoke 31 when magnetizing the magnet 21 may be formed solely with a single type of core which is the second rotor cores 31a while the outer area 13 may be prevented from being deformed by the application of outer force.

In the second rotor yoke 31, because the opening portion 32a exists, the number of the bridge portions 15a is decreased to a half compared to that of the first rotor yoke 11. As a result, the leakage amount of the magnetic field line between the outer areas 13, 13 may be decreased while magnetic efficiency of the second rotor yoke 31 is increased. That is, for example, magnetic efficiency of the motor 1 applying the second rotor yoke 31 is increased when the motor 1 is in operation.

Figure 8:
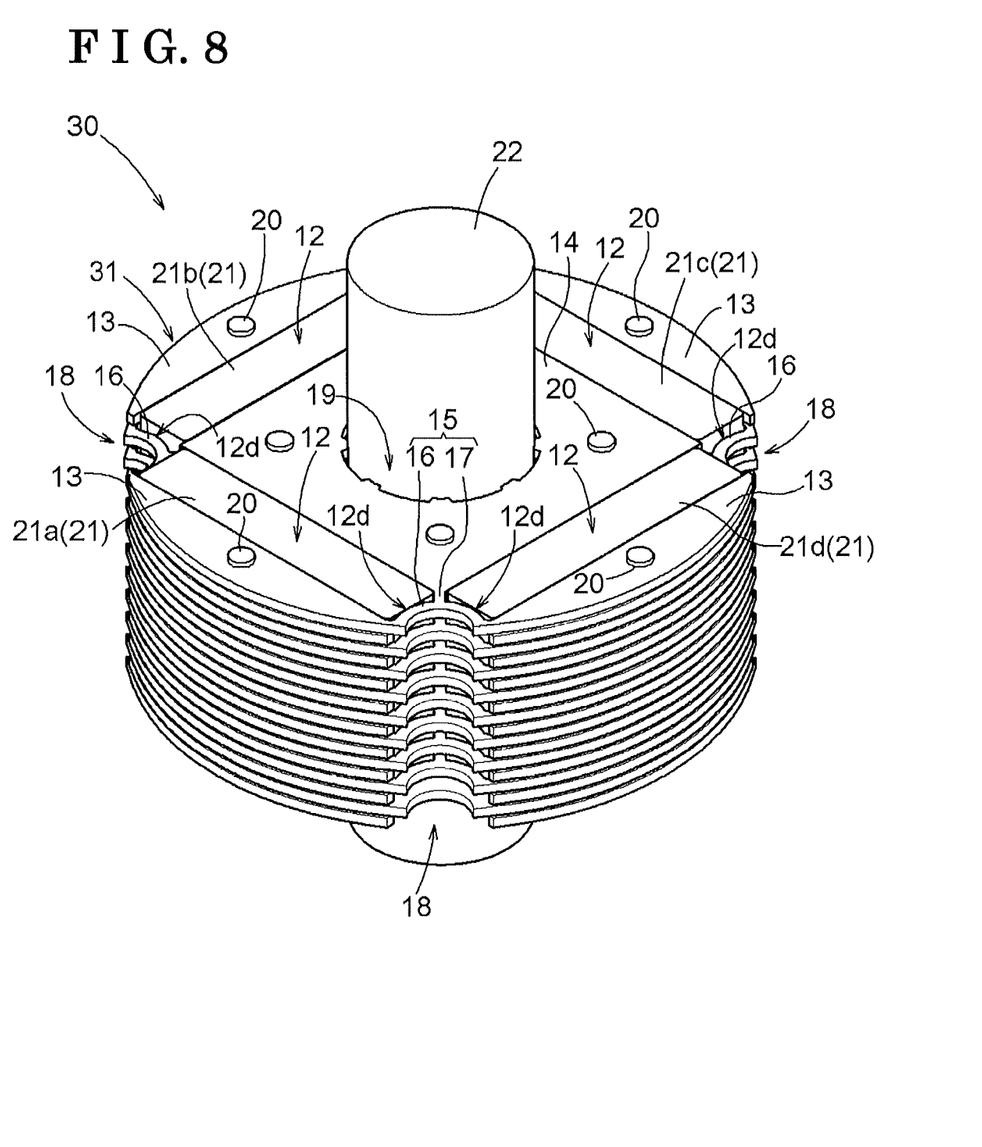
FIG. 8 is a perspective view of an exterior of the second rotor.

As illustrated in FIG. 8, for example, four sheets of the magnet 21 are inserted into and fixed to the second rotor yoke 31 before being magnetized. Then, the rotation shaft 22 is press-fitted into the rotation shaft inserting hole 19 and an assembling of the second rotor 30 is completed. An assembling of the motor 1 is completed by assembling the second rotor 30, the stator 50, the bearing 2, the bearing 3 and the cover 4.

According to the second embodiment, the second rotor yoke 31 is configured by laminating solely with a single type of core which is the second rotor core 31a. However, only two sheets of the second rotor cores 31a which are at opposite end sides, or outer most ends of the second rotor yoke 31 may be replaced with the first rotor cores 11a. By replacing with the first rotor cores 11a, the rotor cores at the opposite end sides, or outer most ends do not include the opening portion 32a, and as a result, the outer area 13 may be further prevented from being deformed by the application of outer force while maintaining magnetic efficiency of the second rotor yoke 31. That is, for example, magnetic efficiency of the motor applying the second rotor yoke 31 is increased when the motor 1 is in operation.

Further, the first rotor core 11a and the second rotor core 31a may be either alternately laminated or freely mixed to configure the second rotor 30.

According to the second embodiment, compared to the first rotor core 11a of the first embodiment in which the first bridge portion 16a and the second bridge portion 17a are formed at each portion between the magnet inserting holes 12a, 12a adjacent to one another, a configuration of the second rotor core 31a is that the first bridge portion 16a and the second bridge portion 17a are removed alternately in a circumferential direction to form the opening portion 32a, which is not limited to this. In a case where the numbers of the magnet 21 and the recessed portion 18 are increased to configure the first rotor 10, every three or four of the first bridge portions 16a and the second bridge portions 17a may be removed in the circumferential direction instead of removing alternately. Alternatively, the first bridge portions 16a and the second bridge portions 17a may be removed randomly.

According to the second embodiment, the opening portion 32a of the second rotor core 31a is sandwiched by the first bridge portions 16a and the second bridge portions 17a arranged at the upper and lower sides, which is not limited to this. For example, two or more of the opening portions 32a may be laminated in the same direction adjacent to one another when viewed from the laminating direction before being sandwiched by the first bridge portions 16a and the second bridge portions 17a in the upper-lower direction.

To summarize above, according to the second embodiment, it may be freely determined where and how many of the first bridge portions 16a and the second bridge portions 17a are to be removed to configure the second rotor yoke 31. Alternatively, the first rotor core 11a and the second rotor core 31a may be laminated in random order. However, it is preferable to laminate the second rotor core 31a to arrange the opening portion 32a in a balanced manner either in a circumferential direction or in an axial direction in order to reduce speed unevenness and torque fluctuation and to achieve a stable rotation of the motor 1 in operation.

According to the second embodiment, in a case where other means than using the recessed portion 18 for positioning the second rotor yoke 31 against a magnetizing yoke when magnetizing the magnet 21 is applied, the recessed portions 18a is unnecessarily included in the second rotor core 31a.

Figure 9:
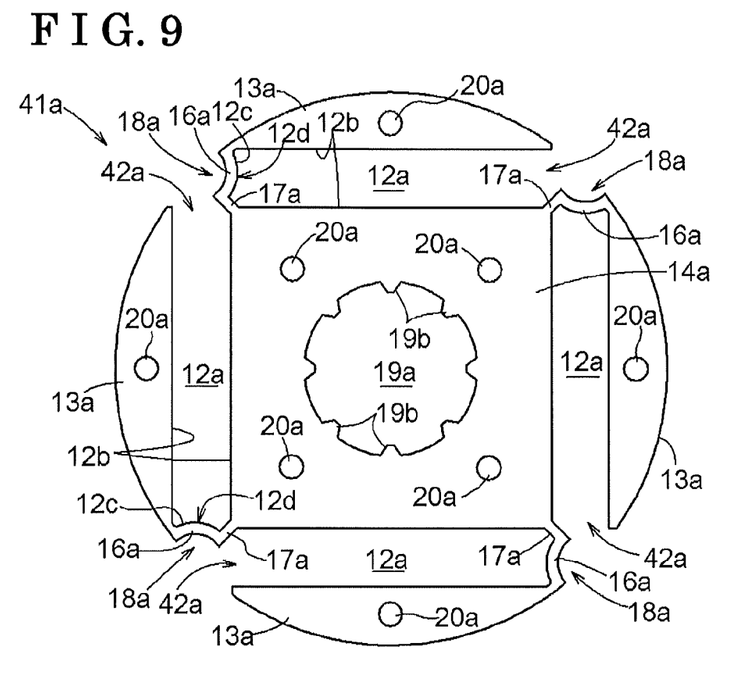
FIG. 9 is a plan view of a third rotor core forming a third rotor yoke.

A third embodiment will be described with reference to FIG. 9 as follows. A third rotor yoke 41 is configured by alternately laminating a third rotor core 41a and a fourth rotor core 41b. As illustrated in FIG. 9, compared to the first rotor core 11a in which the first bridge portions 16a is formed at each portion between the magnet inserting holes 12a, 12a adjacent to one another, a configuration of the third rotor core 41a is that a part of the first bridge portion 16a provided in an anti-clockwise direction from the second bridge portion 17a in FIG. 9 is removed to form a first opening portion 42a. By including the first opening portion 42a, one side of the magnet inserting hole 12a is opened radially outward.

Figure 10:
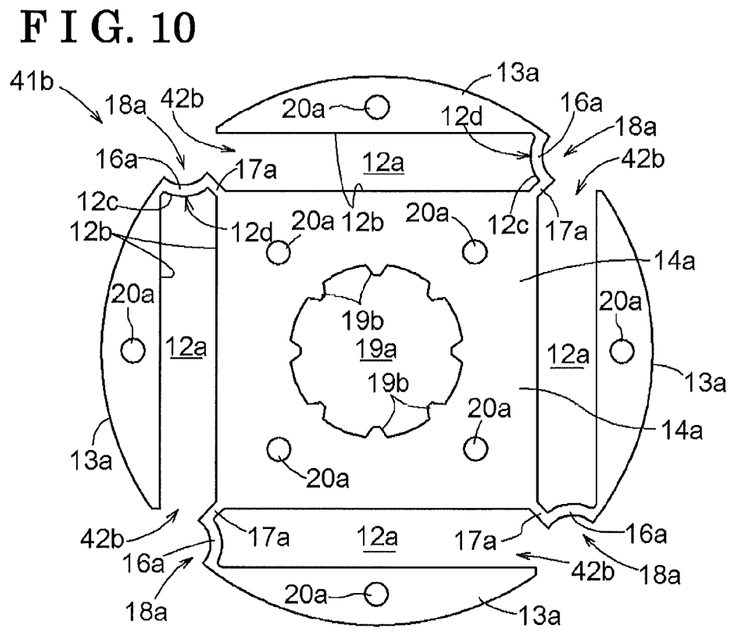
FIG. 10 is a plan view of a fourth rotor core forming a third rotor yoke.

As illustrated in FIG. 10, compared to the first rotor core 11a in which the first bridge portions 16a is formed at each portion between the magnet inserting holes 12a, 12a adjacent to one another, a configuration of the fourth rotor core 41b is that a part of the first bridge portion 16a provided in a clockwise direction from the second bridge portion 17a is removed to form a second opening portion 42b. By including the second opening portion 42b, one side of the magnet inserting hole 12a is opened radially outward.

With a construction that the first opening portion 42a and the second opening portion 42b are included, magnetic resistance is increased as the electromagnetic steel plates do not exist at the portion where the part of the first bridge portion 16a is removed. When magnetic resistance is increased at the portion where the part of the first bridge portion 16a is removed, the leakage amount of the magnetic field line to the portion where magnetic resistance is increased is decreased. However, as the outer area 13a is supported at one side, the outer area 13a may easily be deformed in a case where, for example, outer force is applied before being laminated.

Figure 11:
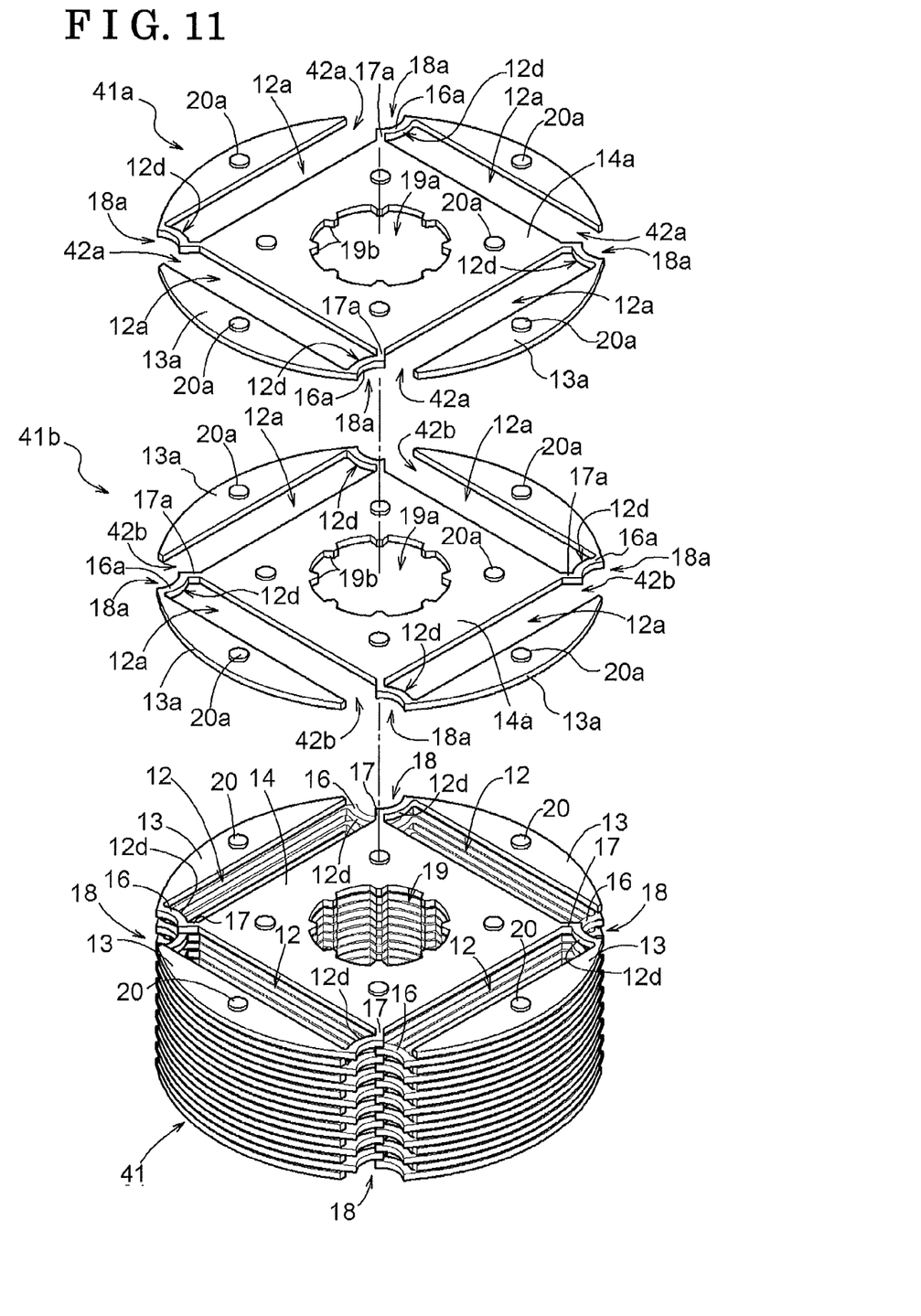
FIG. 11 is a perspective view of an exterior of the third rotor yoke.

As illustrated in FIG. 11, the third rotor yoke 41 is configured by alternately laminating the third rotor core 41a and the fourth rotor core 41b. The outer area 13a of the third rotor core 41a extending in the clockwise direction and supported at one side in FIG. 11 is sandwiched by the outer areas 13a of the fourth rotor cores 41b extending in the anti-clockwise direction and supported at one side in FIG. 11. Accordingly, the outer area 13 maintains strength to refrain the outer area 13a from being deformed while forming the magnet inserting hole 12 holding the magnet 21 and the recessed portion 18 having a form for positioning the third rotor yoke 41 when magnetizing the magnet 21.

Because of the first opening portion 42a and the second opening portion 42b, the third rotor yoke 41 includes only a half of the first bridge portions 16a compared to that of the first rotor yoke 11. As a result, the leakage amount of the magnetic field lines between the outer areas 13, 13 may be decreased while magnetic efficiency of the third rotor yoke 41 is increased. That is, for example, magnetic efficiency of the motor 1 applying the third rotor yoke 41 is increased when the motor 1 is in operation.

Figure 12:
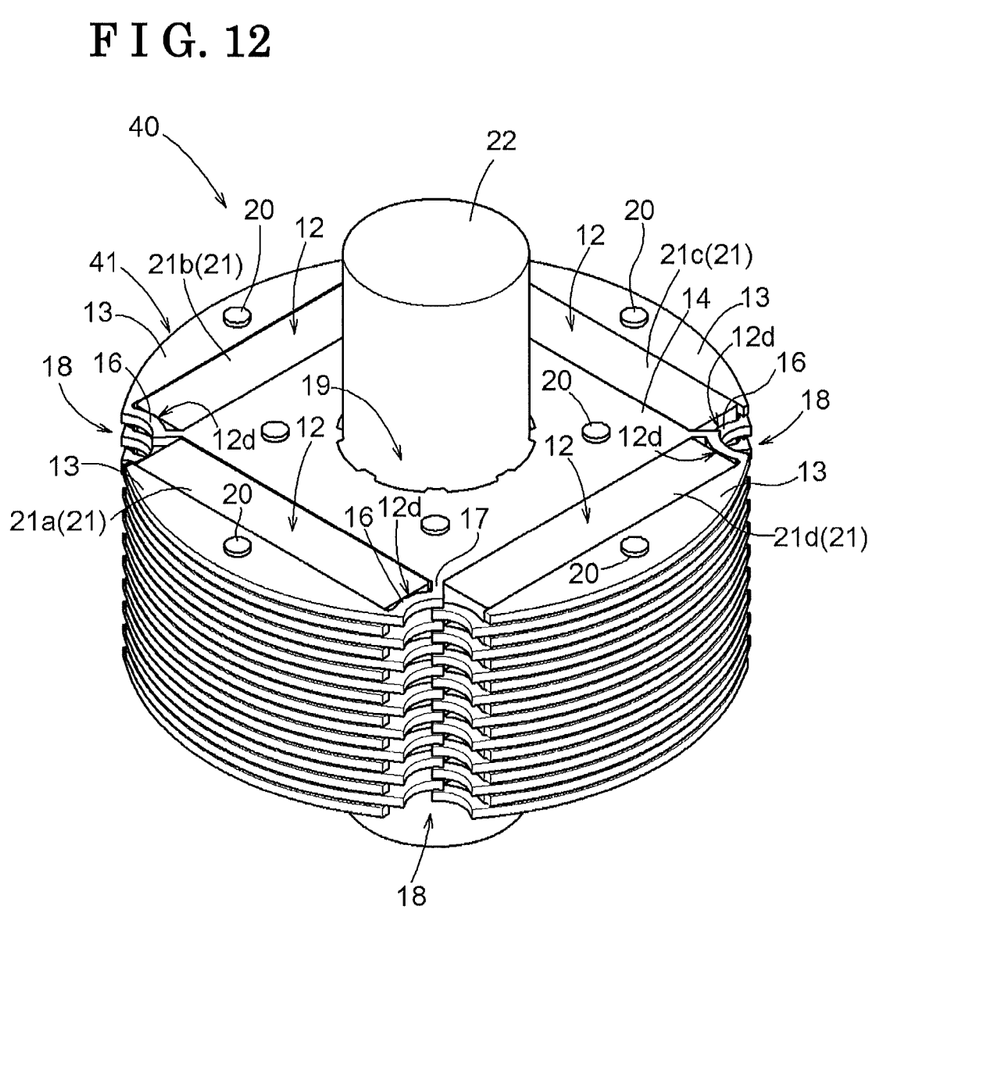
FIG. 12 is a perspective view of an exterior of the third rotor.

As illustrated in FIG. 12, for example, four sheets of the magnet 21 are inserted into and fixed to the third rotor yoke 41 to be magnetized before the rotation shaft 22 is press-fitted into the rotation shaft inserting hole 19. Then, an assembling of the third rotor 40 is completed. An assembling of the motor 1 is completed by assembling the third rotor 40, the stator 50, the bearing 2, the bearing 3 and the cover 4.

According to the third embodiment, the third rotor yoke 41 is configured by alternately laminating the third rotor core 41a and the fourth rotor core 41b. However, two sheets of the third rotor cores 41a or the fourth rotor cores 41b at top-bottom sides of the third rotor yoke 41 may be replaced with the first rotor cores 11a. By replacing with the first rotor cores 11a, the rotor cores at top-bottom sides do not include the first opening portions 42a and the second opening portions 42b so that the outer area 13 may be further refrained from being deformed by the application of outer force while magnetic efficiency of the third rotor yoke 41 is maintained. That is, for example, magnetic efficiency of the motor 1 applying the third rotor yoke 41 is maintained when the motor 1 is in operation.

According to the third embodiment, it may be freely determined where and how many of portions of the first bridge portions 16a are to be removed at the third rotor core 41a and the fourth rotor core 41b. Alternately, a sequence to laminate the third rotor core 41a and the fourth rotor core 41b may be freely specified. However, it is preferable to laminate the third rotor core 41a to arrange the first opening portion 42a and the second opening portion 42b in a balanced manner in an axial direction in order to reduce speed unevenness and torque fluctuation and to achieve a stable rotation of the motor 1 in operation.

According to the third embodiment, in a case where other means than using the recessed portion 18 for positioning the third rotor yoke 41 against a magnetizing yoke when magnetizing the magnet 21 is applied, the recessed portion 18a is unnecessarily included in the third rotor core 41a and the fourth rotor core 41b.

Configurations of the first embodiment through the third embodiment aforementioned may be combined wherever possible.

This disclosure may be applied to a rotor yoke which is configured by laminating electromagnetic steel plates and to a motor using the rotor yoke.

According to the above aforementioned embodiment, the rotor yoke 11, 31, 41 includes the plural rotor cores 11a, 31a, 41a, 41b having a disk shape laminated to be formed in a cylindrical shape, the plural magnet inserting holes 12, 12a each including the long side 12b and the short side 12c arranged on the surface of the rotor cores 11a, 31a, 41a, 41b orthogonal to the rotation shaft, the long side 12b of the magnet inserting holes 12, 12a arranged separately from one another near the outer circumferential surface of the rotor cores 11a, 31a, 41a, 41b along the circumferential direction, the magnet inserting holes 12, 12a penetrated in the laminating direction of the rotor yoke 11, 31, 41, the bridge portion 15, 15a arranged between the magnet inserting holes 12, 12a adjacent to one another in the circumferential direction of the rotor cores 11a, 31a, 41a, 41b and connecting the inner area 14, 14a arranged radially inward of the magnet inserting holes 12, 12a to the outer area 13, 13a arranged radially outward of the magnet inserting hole 12, 12a, the recessed portion 18, 18a arranged at the bridge portion 15, 15a and formed from the outer circumferential surface of the rotor cores 11a, 31a, 41a, 41b toward radially inward, and the protruding edge 12d arranged at the bridge portion 15, 15a and protruding toward the inside of the magnet inserting hole 12, 12a to include the most protruding edge 12d at the portion of the short side 12c.

According to the above described structure, because the protruding edge 12d is at the portion of the short side 12c, the clearances exist between the corner portions of the magnet 21 and the short side 12c with the magnet inserted into the magnet inserting hole. Accordingly, without the chamfering process, the stress from the magnet inserting hole 12, 12a is not applied to the corner portions of the magnet 21 after the magnet 21 is inserted. Even if the corner portions of the magnet 21 are sharp, the corner portions may not be chipped or broken. By using the recessed portion 18, 18a for positioning the rotor yoke 11, 31, 41 against the magnetizing yoke, known rivet holes acting as magnetic resistance somewhere at the magnetic path when the motor 1 is operated as the electric motor are not needed at the rotor laminated steel plate. Accordingly, magnetic efficiency of the rotor yoke 11, 31, 41 does not decline. That is, for example, when the motor 1 applying the rotor yoke 11, 31, 41 of the disclosure is in operation, magnetic efficiency of the motor 1 does not decline by an existence of the recessed portion 18, 18a because the recessed portion 18, 18a is not arranged at a portion of the magnetic path formed by a magnetic field line of the magnet 21.

According to the above aforementioned embodiment, the recessed portion 18, 18a has the arc shape arranged on the surface of the rotor cores 11a, 31a, 41a, 41b orthogonal to the rotation shaft.

According to the above described structure, the cylindrical shaft may be used at the recessed portion 18 instead of the rectangular member adjusting the height of the magnet and the rotor yoke 11, 31, 41 for positioning the rotor yoke 11, 31, 41 against the magnetizing yoke. Because the rectangular member is not required, the height of the rotor yoke 11, 31, 41 may be kept low by a thickness of the rectangular member. Also, as the cylindrical shaft for positioning the rotor yoke is lower in cost than the rectangular member inserted in the magnet inserting hole to adjust the height of the magnet and the rotor yoke for positioning the rotor yoke against the magnetized yoke, the positioning of the rotor yoke may be performed with the low cost structure.

According to the above aforementioned embodiment, the bridge portion 15, 15a includes the first bridge portion 16, 16a and the second bridge portion 17, 17a and the first bridge portion is formed to connect to the plural outer areas 13, 13a adjacent to one another, and the second bridge portion 17, 17a is formed to connect the first bridge portion 16, 16a to the inner area 14, 14a in which at least one of widths of the first bridge portion 16, 16a and the second bridge portion 17, 17a arranged on the surface of the rotor cores 11a, 31a, 41a, 41b orthogonal to the rotation shaft is equal to a plate-thickness of the rotor cores 11a, 31a, 41a, 41b.

According to the above described structure, even if the part of the magnetic field lines from the outer area 13, 13a which does not enter into the stator 50 facing the outer area 13, 13a leaks and enters into the first bridge portion 16, 16a where magnetic resistance is low, the first bridge portion 16, 16a immediately causes magnetic saturation and accordingly, other magnetic field lines do not enter into the first bridge portion 16, 16a. Furthermore, the edges of the outer area 13, 13a and the first bridge portion 16, 16a are intersected substantially at a right angle so that the magnetic paths between the outer areas 13, 13a adjacent to one another are not connected in the shortest distance and need to take the detour via the first bridge portion 16, 16a. The magnetic field lines try to pass the shortest distance between the outer areas 13, 13a adjacent to one another. However, in a case where a magnetic path connecting the outer areas 13, 13a adjacent to one another curves, rounds or winds as a shape of the first bridge portion 16, 16a, the magnetic path does not pass smoothly between the outer areas 13, 13a adjacent to one another. As a result, the leakage amount of the magnetic field lines is decreased and magnetic efficiency of the rotor yoke 11, 31, 41 is improved. That is, for example, magnetic efficiency of the motor 1 applying the rotor yoke 11, 31, 41 is increased when the motor 1 is in operation.

According to the above aforementioned embodiment, at least one of the bridge portions 15, 15a is removed and the magnet inserting hole 12, 12a communicates with the recessed portion 18, 18a at a part or all of the laminated rotor cores 11a, 31a, 41a, 41b.

According to the above described structure, as the electromagnetic steel plate is removed at the portion where the bridge portion 15a is removed, magnetic resistance at the portion where the bridge portion 15a is removed is increased. When magnetic resistance is increased, the leakage amount of magnetic field lines to the portion where magnetic resistance is increased is decreased and the amount of the magnetic field lines entering into the stator 50 is relatively increased. As a result, the leakage amount of the magnetic field line between the outer areas 13a adjacent to one another may be decreased magnetic efficiency of the second rotor yoke 31 is improved. That is, for example, magnetic efficiency of the motor 1 applying the second rotor yoke 31 is increased when the motor 1 is in operation.

According to the above aforementioned embodiment, the bridge portion 15, 15a is alternately removed in the circumferential direction from all the rotor cores 11a, 31a, 41a, 41b except for the rotor cores 11a, 31a, 41a, 41b arranged at opposite end sides, and a clearance provided by removing the bridge portion 15, 15a and the bridge portion 15, 15a adjacent to one another are arranged to be overlapped in the laminating direction to form the rotor yoke 11, 31, 41.

According to the above described structure, the clearance provided by removing the bridge portion 15, 15a of the second rotor core 31a is sandwiched by the bridge portions 15, 15a arranged at the upper and lower sides. As a result, the magnet inserting hole 12a for holding the magnet 21 and the recessed portion 18a having a form for positioning the second rotor yoke 31 when magnetizing the magnet 21 may be formed solely with a single type of core while the outer area 13a may be prevented from being deformed by the application of outer force. As the bridge portions 15a are reduced, the leakage amount of the magnetic field line between the outer areas 13a may be decreased magnetic efficiency of the second rotor yoke 31 is improved. That is, for example, magnetic efficiency of the motor 1 applying the second rotor yoke 31 is increased when the motor 1 is in operation.

According to the above aforementioned embodiment, at least a portion of the first bridge portions 16, 16a is removed and the magnet inserting hole 12, 12a communicates with the recessed portion 18, 18a at a part or all of the laminated rotor cores 11a, 31a, 41a, 41b while the second bridge portion 17, 17a, instead of being removed, connects to a residual portion of the first bridge portion 16, 16a.

According to the above described structure, as the electromagnetic steel plate is removed at the portion where the bridge portion 15a is removed, magnetic resistance at the portion where the bridge portion 15a is removed is increased. When magnetic resistance is increased, the leakage amount of magnetic field lines to the portion where magnetic resistance is increased is decreased and the amount of the magnetic field lines entering into the stator 50 is relatively increased. As a result, the leakage amount of the magnetic field line between the outer areas 13a is decreased magnetic efficiency of the second rotor yoke 31 is improved. That is, for example, magnetic efficiency of the motor 1 applying the second rotor yoke 31 is increased when the motor 1 is in operation.

According to the above aforementioned embodiment, except for the rotor cores 11a, 31a, 41a, 41b arranged at the opposite end sides, in a view seen along the laminating direction, a first rotor core 11a, 31a, 41a, 41b, by removing the part of the first bridge portion 16, 16a, includes the first bridge portion 16, 16a connecting to one of the outer areas 13, 13a arranged at opposite sides of the first bridge portion 16, 16a and to the second bridge portion 17, 17a, and not connecting to the other outer areas 13, 13a, and a second rotor core 11a, 31a, 41a, 41b, by removing the part of the first bridge portion 16, 16a, includes the first bridge portion 16, 16a connecting to the other outer areas 13, 13a arranged at the opposite sides of the first bridge portion 16, 16a and to the second bridge portion 17, 17a, and not connecting to said one of the outer areas 13, 13a, and in which the first rotor core 11a, 31a, 41a, 41b and the second rotor core 11a, 31a, 41a, 41b are laminated alternately to form the rotor yoke 11, 31, 41.

According to the above described structure, the first opening portion 42a and the second opening portion 42b of the third rotor core 41a and the fourth rotor core 41b, respectively, are sandwiched by the first bridge portions 16a arranged at upper and lower sides. As a result, the magnet inserting hole 12a for holding the magnet 21 and the recessed portion 18a having a form for positioning the third rotor yoke 41 when magnetizing the magnet 21 may be formed even if the first opening portions 42a and the second opening portion 42b exist while the outer area 13a may be prevented from being deformed by the application of outer force. As the first opening portion 42a and the second opening portion 42b are included, the leakage amount of the magnetic field line between the outer areas 13a adjacent to one another may be decreased magnetic efficiency of the third rotor yoke 41 is improved. That is, for example, magnetic efficiency of the motor 1 applying the third rotor yoke 41 is increased when the motor 1 is in operation.

According to the above aforementioned embodiment, a motor 1 includes the rotor yoke 11, 31, 41 including the plural rotor cores 11a, 31a, 41a, 41b having a disk shape laminated to be formed in a cylindrical shape, the plural magnet inserting holes 12, 12a each including the long side 12b and the short side 12c arranged on a surface of the rotor cores 11a, 31a, 41a, 41b orthogonal to the rotation shaft, the long side 12b of the magnet inserting holes 12, 12a arranged separately from one another near the outer circumferential surface of the rotor cores 11a, 31a, 41a, 41b along the circumferential direction, the magnet inserting holes 12, 12a penetrated in the laminating direction of the rotor yoke 11, 31, 41, the bridge portion 15, 15a arranged between the magnet inserting holes 12, 12a adjacent to one another in the circumferential direction of the rotor cores 11a, 31a, 41a, 41b and connecting the inner area 14, 14a arranged radially inward of the magnet inserting holes 12, 12a to the outer area 13, 13a arranged radially outward of the magnet inserting hole 12, 12a, the recessed portion 18, 18a arranged at the bridge portion 15, 15a and formed from the outer circumferential surface of the rotor cores 11a, 31a, 41a, 41b toward radially inward, and the protruding edge 12d arranged at the bridge portion 15, 15a and protruding toward the inside of the magnet inserting hole 12, 12a to include the most protruding edge 12d at the portion of the short side 12c.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A rotor yoke, comprising:
a plurality of rotor cores laminated to be formed in a cylindrical shape, each of the plurality of rotor cores possessing a disk shape;
a plurality of magnet inserting holes, each including a longitudinal side and a transverse side arranged on a surface of the rotor cores orthogonal to a rotation shaft, the longitudinal sides of the magnet inserting holes being arranged separately from one another near an outer circumferential surface of the rotor cores along a circumferential direction, the magnet inserting holes penetrating the rotor yoke in a laminating direction of the rotor yoke;
a bridge portion arranged between two of the magnet inserting holes that are adjacent to one another in a circumferential direction of the rotor cores, the bridge portion connecting an inner area arranged radially inward of the magnet inserting holes to an outer area arranged radially outward of the magnet inserting holes;
a recessed portion arranged at the bridge portion and formed from the outer circumferential surface of the rotor cores toward a radially inward direction;
a protruding edge of one of the magnet inserting holes being arranged at the bridge portion and protruding toward an inside of the one magnet inserting hole, the protruding edge including a most protruding edge at a portion of the transverse side of the one magnet inserting hole; and
the protruding edge forming first and second clearance portions when a magnet is located in the one magnet inserting hole, the first clearance portion being formed by one end of the transverse side of the one magnet inserting hole and being recessed toward an outside of the one magnet inserting hole, and the second clearance portion being formed by another end of the transverse side of the one magnet inserting hole and being recessed toward the outside of the one of the magnet inserting holes.

2. The rotor yoke according to claim 1, wherein the recessed portion has an arc shape arranged on the surface of the rotor cores orthogonal to the rotation shaft.

3. The rotor yoke according to claim 1, wherein the bridge portion includes a first bridge portion and a second bridge portion, the outer area is one of a plurality of outer areas, the first bridge portion is formed to connect adjacent ones of the plurality of the outer areas adjacent to one another, and a second bridge portion is formed to connect the first bridge portion to the inner area, wherein, at least one of widths of the first bridge portion and the second bridge portion arranged on the surface of the rotor cores orthogonal to the rotation shaft is equal to a plate-thickness of the rotor cores.

4. The rotor yoke according to claim 1, wherein at least one of the bridge portions is removed and the magnet inserting hole communicates with the recessed portion at a part or all of the laminated rotor cores.

5. The rotor yoke according to claim 4, wherein the bridge portion is alternately removed in a circumferential direction from all the rotor cores except for the rotor cores arranged at opposite end sides, and a clearance provided by removing the bridge portion and the bridge portion adjacent to one another are arranged to be overlapped in the laminating direction to form the rotor yoke.

6. The rotor yoke according to claim 3, wherein at least a portion of the first bridge portion is removed and the magnet inserting hole communicates with the recessed portion at a part or all of the laminated rotor cores while the second bridge portion, instead of being removed, connects to a residual portion of the first bridge portion.

7. The rotor yoke according to claim 6, wherein, except for the rotor cores arranged at opposite end sides, in a view seen along the laminating direction, a first rotor core, by removing a part of the first bridge portion, includes the first bridge portion connecting to one of the outer areas arranged at opposite sides of the first bridge portion and to the second bridge portion, and not connecting to the other outer areas, and a second rotor core, by removing a part of the first bridge portion, includes the first bridge portion connecting to the other outer areas arranged at the opposite sides of the first bridge portion and to the second bridge portion, and not connecting to said one of the outer areas, and wherein the first rotor core and the second rotor core are laminated alternately to form the rotor yoke.

8. A motor, comprising:
a rotor yoke including
a plurality of rotor cores laminated to be formed in a cylindrical shape, each of the plurality of rotor cores possessing a disk shape;
a plurality of magnet inserting holes, each including a longitudinal side and a transverse side arranged on a surface of the rotor cores orthogonal to a rotation shaft, the longitudinal sides of the magnet inserting holes being arranged separately from one another near an outer circumferential surface of the rotor cores along a circumferential direction, the magnet inserting holes penetrating the rotor yoke in a laminating direction of the rotor yoke;
a bridge portion arranged between two of the magnet inserting holes that are adjacent to one another in a circumferential direction of the rotor cores, the bridge portion connecting an inner area arranged radially inward of the magnet inserting holes to an outer area arranged radially outward of the magnet inserting holes;
a recessed portion arranged at the bridge portion and formed from the outer circumferential surface of the rotor cores toward a radially inward direction;
a protruding edge of one of the magnet inserting holes being arranged at the bridge portion and protruding toward an inside of the one magnet inserting hole, the protruding edge including a most protruding edge at a portion of the transverse side of the one magnet inserting hole; and
the protruding edge forming first and second clearance portions when a magnet is located in the one magnet inserting hole, the first clearance portion being formed by one end of the transverse side of the one magnet inserting hole and being recessed toward an outside of the one magnet inserting hole, and the second clearance portion being formed by another end of the transverse side of the one magnet inserting hole and being recessed toward the outside of the one of the magnet inserting holes.

9. The motor according to claim 8, wherein the recessed portion has an arc shape arranged on the surface of the rotor cores orthogonal to the rotation shaft.

10. The motor according to claim 8, wherein the bridge portion includes a first bridge portion and a second bridge portion, the outer area is one of a plurality of outer areas, the first bridge portion is formed to connect adjacent ones of the plurality of the outer areas adjacent to one another, and a second bridge portion is formed to connect the first bridge portion to the inner area, wherein, at least one of widths of the first bridge portion and the second bridge portion arranged on the surface of the rotor cores orthogonal to the rotation shaft is equal to a plate-thickness of the rotor cores.

11. The motor according to claim 8, wherein at least one of the bridge portions is removed and the magnet inserting hole communicates with the recessed portion at a part or all of the laminated rotor cores.

12. The motor according to claim 8, wherein the bridge portion is alternately removed in a circumferential direction from all the rotor cores except for the rotor cores arranged at opposite end sides, and a clearance provided by removing the bridge portion and the bridge portion adjacent to one another are arranged to be overlapped in the laminating direction to form the rotor yoke.

13. The motor according to claim 8, wherein at least a portion of the first bridge portion is removed and the magnet inserting hole communicates with the recessed portion at a part or all of the laminated rotor cores while the second bridge portion, instead of being removed, connects to a residual portion of the first bridge portion.

14. The motor according to claim 8, wherein, except for the rotor cores arranged at opposite end sides, in a view seen along the laminating direction, a first rotor core, by removing a part of the first bridge portion, includes the first bridge portion connecting to one of the outer areas arranged at opposite sides of the first bridge portion and to the second bridge portion, and not connecting to the other outer areas, and a second rotor core, by removing a part of the first bridge portion, includes the first bridge portion connecting to the other outer areas arranged at the opposite sides of the first bridge portion and to the second bridge portion, and not connecting to said one of the outer areas, and wherein the first rotor core and the second rotor core are laminated alternately to form the rotor yoke.

15. A rotor yoke, comprising:
a plurality of rotor cores laminated to form a cylindrical shape, each of the plurality of rotor cores possessing a disk shape;
a plurality of magnet inserting holes passing through each of the rotor cores, each magnet insertion hole including a longitudinal side and first and second transverse sides arranged on a surface of the rotor cores orthogonal to a rotation shaft, the longitudinal sides of the magnet inserting holes being arranged separately from one another near an outer circumferential surface of the rotor cores along a circumferential direction, the magnet inserting holes penetrating respective ones of the rotor cores in a laminating direction of the rotor yoke;
a bridge portion between two of the magnet inserting holes that are adjacent to one another in a circumferential direction of each rotor core, the bridge portion connecting an inner area arranged radially inward of the magnet inserting holes to an outer area arranged radially outward of the magnet inserting holes;
a recessed portion arranged at the bridge portion and formed from the outer circumferential surface of the rotor cores toward a radially inward direction;
the magnet inserting holes being shaped and arranged such that when a magnet possessing a rectangular cross section is located in a respective one of the magnet inserting holes, the magnet possessing a first shorter side between two first corners of the rectangular cross section and a second shorter side between two second corners of the rectangular cross section, the first shorter side of the magnet contacts the first transverse side, the second shorter side of the magnet contacts the second transverse side, and the two first corners of the magnet are spaced from the first transverse side.

16. The rotor yoke according to claim 15, wherein two second corners of the magnet are spaced from the second transverse side.

17. The rotor yoke according to claim 15, wherein the recessed portion has an arc shape arranged on the surface of the rotor cores orthogonal to the rotation shaft.

18. The rotor yoke according to claim 15, wherein the bridge portion includes a first bridge portion and a second bridge portion, the outer area is one of a plurality of outer areas, the first bridge portion being formed to connect adjacent ones of the plurality of the outer areas to one another, and a second bridge portion is formed to connect the first bridge portion to the inner area, wherein at least one of widths of the first bridge portion and the second bridge portion arranged on the surface of the rotor cores orthogonal to the rotation shaft is equal to a plate-thickness of the rotor cores.

* * * * *